Figure 1:
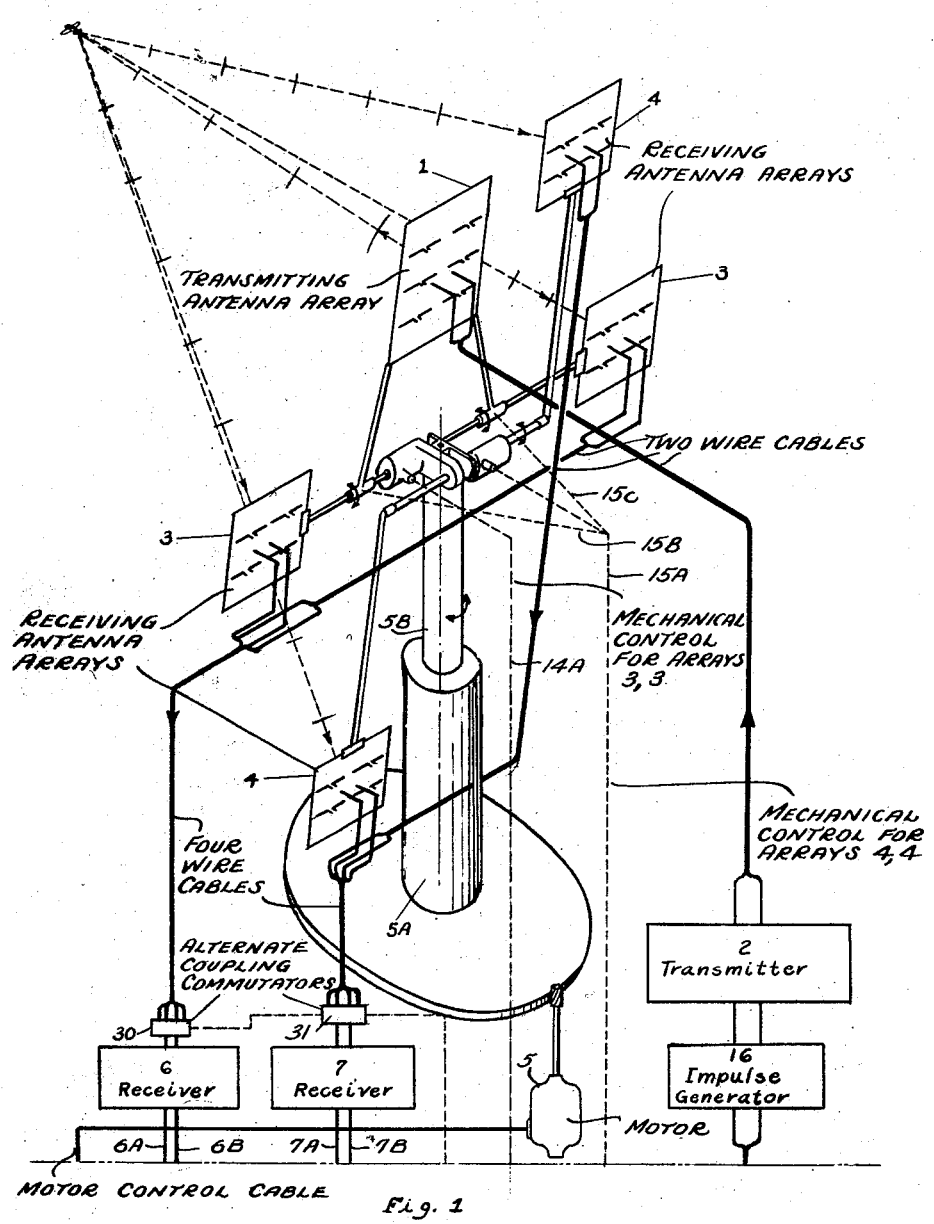

Inventor:
HENRI G. BUSIGNIES
By [signature]
Attorney

United States Patent Office 2,855,592
Patented Oct. 7, 1958

2,855,592

POSITION FINDING SYSTEM FOR GUN FIRE CONTROL

Henri G. Busignies, Forest Hills, N. Y., assignor to International Standard Electric Corporation, New York, N. Y., a corporation of Delaware Application March 4, 1941, Serial No. 381,640

Claims priority, application France April 27, 1940

27 Claims. (Cl. 343—11)

The present invention relates to devices for position finding by means of electro-magnetic waves, and is particularly useful for gun fire control.

One of the objects of the invention is that of furnishing to a gun fire direction station the distance, the azimuth and the elevation of a movable object, e. g. an airplane. Another object of the invention is the providing of a look-out system that may be combined with the position finding system.

It is known that the geometrical elements of gun fire control are the distance, the elevation, i. e. the angle that the direction of the obstacle forms with the horizontal line passing through the position finding station, and the azimuth, i. e. the angle formed by the vertical plane in which the obstacle lies with a vertical plane of references that passes through the position finding station.

According to the characteristic features of the invention, there is provided a radio-electric searching or look-out device and means, when an airplane has been detected, that permit of conveniently carrying out the necessary operations for transmitting to the fire control station the geometrical coordinates for adjusting the gun fire on the airplane that has been detected.

The invention, when used for anti-aircraft defense, particularly permits of joint action by a plurality of radio position finding stations that are combined and equipped in such a way as to facilitate determination of the gun firing geometrical coordinates.

The invention provides in particular a radio position finding system that comprises one or more emitters of impulses or wave-peaks in association with a plurality of receivers provided with directional aerials, the directivity of which can be adjusted so as to permit on the one hand a look-out over a great range and, on the other hand, the exact measurement of geometrical coordinates of gun fire, such as the azimuth and the elevation.

The invention provides more especially an emitting antenna with orientable directivity which may, for example, be made to scan a wide zone of space. With this emitting antenna there are associated two groups of receiving aerials, one for determining the elevation angle and the other for determining the azimuth angle. The first group of directional antennae is associated with an indicating device that permits observation over a wide range of space; this device may be a cathode ray oscillograph, called hereinafter a "panoramic" oscillograph. This device is for look-out purposes, i. e. for determining whether there are airplanes in the field scanned periodically by the beam emitted by the directional antenna. The two groups of directional antennae are associated with two receivers which are provided with indicating devices, such as oscillographs that permit the making of precise observations. These oscillographs are called hereinafter "vernier" oscillographs. These receivers are combined with the sender in such a way as to permit measurement of the distance of the objective from the position finding station.

One of the characteristic features of the invention consists in replacing in radio systems of the type in question the making of the measurements by the manipulation at the position finding station of devices that serve, for example, to bring into coincidence on an oscillograph two wave-peaks, of which one is due to the presence of the obstacle and the other, which serves as reference, is produced locally.

Another characteristic feature of the invention consists of the multiple utilization of wave-peaks emitted by the sender for the different operations to be made for determining the geometrical elements of the gun fire.

Another characteristic feature of the invention consists of the utilization of a plurality of fractional time bases for the oscillographs.

The utilization and the mode of operation of a radio position finding station using the features of the invention are briefly explained hereunder.

When the observer at the position finding station sees on the panoramic oscillographs the appearance of a spot that corresponds to a reflection by an airplane of the emitted wave, he gives a warning to two operators who are respectively in charge of the devices for determining the azimuth and the elevation of the airplane.

When, by means of a suitable device, the operator perceives on the panoramic oscillograph a wave-peak that corresponds to a movable object, he selects, by the same maneuver that permits of measurement, a part of the time base in order to observe it in greater detail on several vernier oscillographs utilized for measurement of the elevation and the azimuth and for precise measurement of the distance.

On the vernier oscillograph for measuring the distance, the observer shifts a reference wave-peak until he brings it to coincidence with the wave-peak reflected by the airplane. At that moment, the position of the control member, e. g. a hand wheel manipulated by the operator constitutes a measurement of the distance, and this measurement can be transmitted continuously to the gun fire station.

By the same maneuver, the other vernier oscillographs are made to show the zone under observation in which each operator makes the measurement of elevation and azimuth, respectively, by suitable means such as the displacement of angle finding directional beams.

For the look-out position, the directional systems are directed toward the horizon, since the airplanes are located while they are still at a fairly great distance from the device.

The invention shall be described with reference to one example of embodiment shown in the appended drawings, in which Figs. 1 and 1A taken together show a general diagram of the system in accordance with my invention.

The angle measuring system may, for example, consist of a group of three antenna arrays or horns that each constitute a directional system. These aerials are integral and are orientable horizontally and vertically by mechanical devices, e. g. by ones similar to those used for acoustical position finding.

In connection with the above, it is possible to select a 50 cm. wave for obtaining exact measurements which permits the use of directed antennas or directional reflectors that are easily orientable.

The sending frame transmits continuously so as to "reconnoiter" the airplane by short impulses, preferably rectangular wave-peaks, the duration of which is, for example, of the order of 0.5 microsecond at the cadence of 5000 per second, for example.

The look-out receiver is placed in the circuit of the directional antennas for searching for the elevation or preferably the azimuth, and the wave-peak or reflected impulse is observed on a cathode ray oscillograph.

Figure 1A:
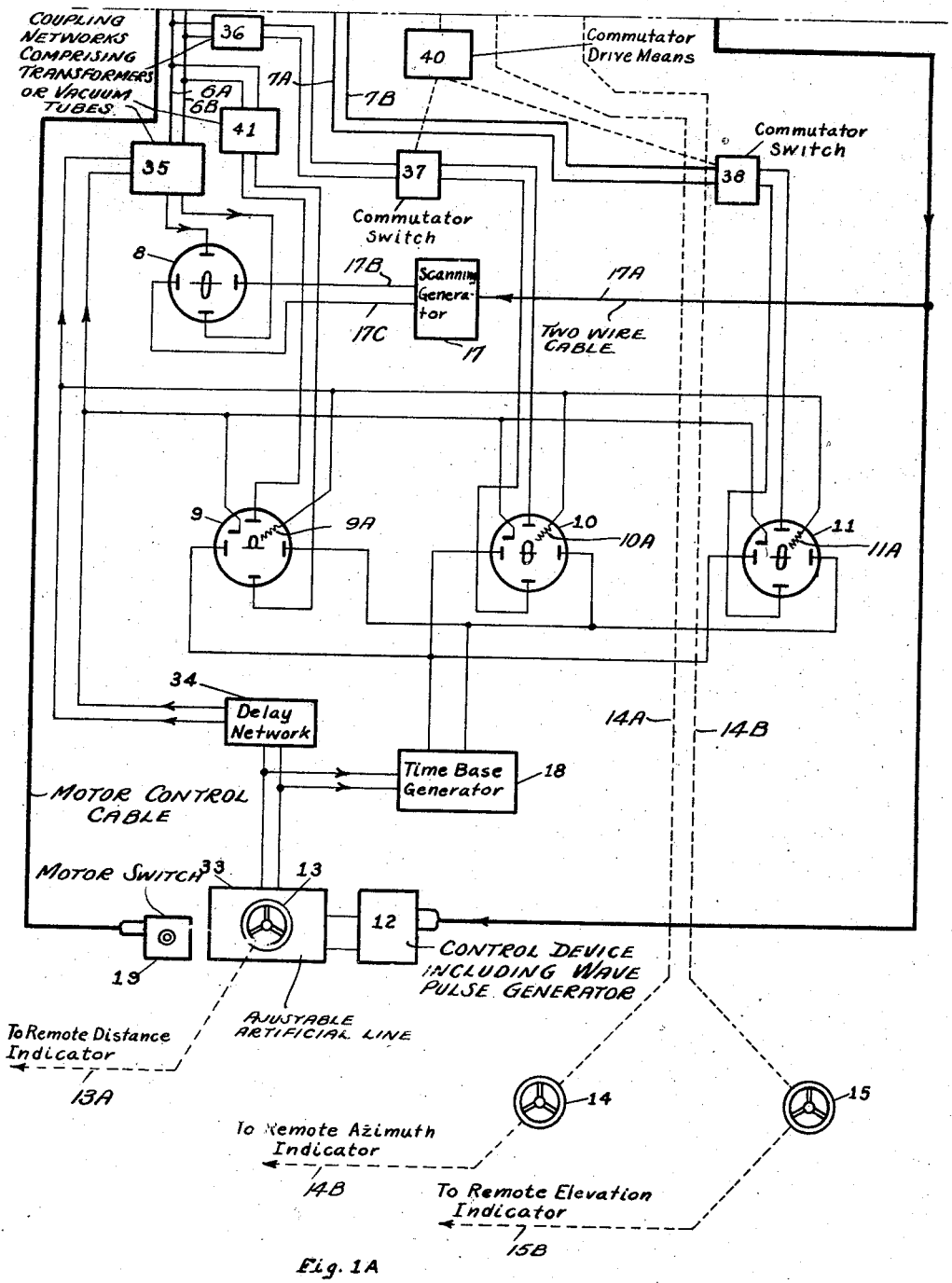

In Fig. 1, 1 represents the emitting antenna unit, 2 represents the transmitter 3, 3 and 4, 4 are the directional antennas for reception of the azimuth and the elevation, and 6 and 7 are the receivers for the azimuth and the elevation, respectively. The two antenna units 3, 3 and 4, 4, each consist of two arrays, each array constituting a directional antenna element, each assembled unit furnishing two identical overlapping reception patterns provided with some means for obtaining on a linear scanning oscillograph two wave-peaks which each correspond to one pattern of the overlapping pair of patterns. This arrangement permits determination of the direction of the reflecting movable object by bringing these two peaks to the same amplitude. The symmetrical diagrams may also be obtained by means of a single antenna having several elements and of a phase shifting device between these elements which is manipulated periodically.

For the look-out, use can be made of either one or the other of these directional systems directed toward the horizon and provided with a vertical or horizontal scanning motion by means of a motor 5, driving shaft 5B supported in bearing 5A.

For the look-out purposes, the directional aerial system of the transmitter may be supported to move integrally with the directional antenna for searching for the azimuth as shown, or even the same antenna may be utilized.

After detection of an object and during the position measurements of the movable object, the azimuth and elevation antennas 3, 3 and 4, 4 respectively are manually adjusted in relative position by control wheels 14 and 15, respectively (Fig. 1A), under the control of the observers as diagrammatically indicated by broken lines 14A, 15A. The emitting antenna may either be integral with one of these two antenna pairs or may be mounted on the same support for movement with one of these pairs, and simultaneously controlled for movement with the other of said pairs, indicated by the control lines 15B, 15C, and by its mounting on the common rod with antennas 3, 3, so as to take best advantage of the power of the emitter.

The receiver used for the look-out may be the same as that for measuring the azimuth, as shown at 6 and the output of which is connected to a "panoramic" cathode ray oscillograph 8. The scanning of the cathode ray is of a duration that is correlated with the maximum distance to be observed. As illustrated, a commutator 30 is provided for successively applying energy from the antennas 3.

If this distance to b indicated on the screen is 30 km. one-way, this scanning will have a duration of 200 microseconds and the corresponding frequency of the emission wave-peaks will be at most 5,000 per second. The scanning is produced by a time base device or scanning generator 17 controlled by the impulse generator 16 of the emitter over line 17A. The cathode ray beam 2 travels once across the screen of oscillograph 8, during the time of travel of a radio wave a distance of 30 km., by the scanning signals applied over line 17B, 17C.

Energy reflected from an object in the field will be received on antennae 3, 3 and applied over commutator 30 to receiver 6. The output of receiver 6 is applied over lines 6A, 6B to oscillograph 8, causing a momentary vertical deflection of the beam to produce an impulse peak.

If several reflecting objects are within the field of observation of the look-out device several impulse peaks will be observed spaced on the screen of oscillograph 8, in accordance with their positions. This object less than the 30 km. distance will be displaced a lesser distance on the cathode ray screen. The observer is thus warned of the presence of several airplanes. The relative distance of these planes is indicated by their displacement along the scanning line.

He then operates a switch to adjust control device 12, controlled by impulses from generator 16 to produce on vernier indicators 9, 10 and 11, which are also oscillographs, the desired section of the scale of oscillograph 8. The device 12 is preferably an adjustable scanning circuit with scale control systems such as disclosed in my prior application entitled "Scanning Devices for Cathode Ray Oscillographs," Ser. No. 380,187, filed February 24, 1941. At the same time he disconnects motor 5 so that the loop positions may be manually adjusted to determine more precisely the location of any one of the desired planes by operation of switch 19.

This device 12 includes a generator for producing the reference impulse or wave-peak that is displaceable in time by means of an artificial line 33 controlled at 13, and it also produces wave-peaks which precede the reference impulse by a given interval of time and serves for controlling the time base circuit 18 of the vernier indicators 9, 10 and 11. The time base generator 18 is controlled by an impulse which precedes the reference impulse by a given amount, for example, five microseconds. A delay net-work 34 in the output of the artificial line 33 causes a delay of the reference peak in its application to the oscillograph 8 so that the wave peaks applied to 18 are ahead of these reference peaks. The impulse is fed directly without delay to the time base generator 18. Thus, the proper interval of control for the vernier tubes 9, 10, 11 is automatically maintained for each adjustment of the artificial line 33.

The delayed reference impulse is applied to the deflecting electrode of tube 8 over a coupling network 35 which prevents interaction between this impulse and other oscillograph plates. This network may be of any desired form such as transformer couplings or vacuum tubes.

It is sufficient for the observer to adjust artificial line 33 to bring the reference peak produced on tube 8, into coincidence with the observed peak or with a selected peak, if there are several. The reference peak may be so applied as to produce an indication below the scanning line, as shown, or may be applied to produce the peaks both on the same side. The former is preferable, however, since then it will not be confused with other wave-peak indications which may represent other airplanes in the field of view. This manipulation of line 33 also controls the scanning position of the vernier oscillograph 9, which scanning only covers a part of the exploration field of the oscillograph 8 around for a limited distance on each side of the reference peak, e. g. a zone extending five micro-seconds from one side to the other of the peak.

The vernier 9 is provided so that the operator adjusting artificial line at 13 may see that the proper section of the time base is selected for use on vernier indicators 10 and 11. Furthermore, if desired the reference impulse may likewise be applied to vernier 9 so a comparison may also be made at this point. It is preferable, however, to apply the reference impulse to a control grid 9A in cathode ray tube 9 to achieve the desired comparison check, the actual comparison being carried out on oscillograph tube 8.

The scanning voltage for the last two oscillographs 10 and 11 is applied from generator 18 so that these tubes have the same period as 9 and the reference impulses are preferably applied to grids 10A and 11A, respectively. Thus, the attending observers of both these devices may receive only the wave peak corresponding to the airplane selected for observation.

Energy from receiver 6 is applied to the deflecting electrodes of oscillograph 10 through a coupling network 36 and a commutator 37 rotated preferably from a drive means 40 which also operates commutator 30. The impulse received from the right and left receiving antenna units 3, 3, respectively, make two pulsation peaks on the screen of oscillograph 8. The pulsations are preferably so polarized by commutator 37 as to produce the respective peaks above and below the scanning line. However, if desired, the commutator may serve to couple the receiver so that the peak indications are arranged side by side. This latter may be accomplished by using a delay network for one of the antenna units.

The operator then adjusts the azimuthal position of units 3, 3 by operation of wheel 14 until the impulse peaks from the two units are of equal magnitude. At this time the receiving antennae 3, 3 are positioned to indicate the azimuthal direction, which may be ascertained by any suitable means, such as a scale operatively associated with wheel 14.

At the same time vertically disposed antenna units 4, 4 are coupled through commutator 31 to receiver 7, and through commutator switch 38 to the deflecting plates of oscillograph 11. Two impulse peaks are provided on the screen of oscillograph 11 in a manner similar to that described in connection with tube 10. By controlling hand wheel 15, which is similar to 14, the vertical antenna units are adjusted to give the elevation direction.

Preferably the transmitting antenna is simultaneously adjusted in azimuth and elevation with the adjustment of 14 and 15 to assure the maximum efficiency of the radiated power in making observations.

It is clear that if desired only one receiver need be furnished and all four antennae 3, 3, 4, 4 may be alternately associated with this receiver through a commutator device, a suitable distributor or commutator device being also provided on the output side of the receiver.

If desired the adjustment of hand wheels 13, 14, 15, may serve to control the position of a gun fire control indicator at the gun station or even position the gun directly. This may be accomplished by the use of flexible shafts connected with the hand wheels or by electrical repeater apparatus of any known form as indicated by the dash lines 13A, 14A, 15A.

The look-out and measurement devices relating to the present invention are not limited to the above specific embodiment. Use may be made, for example, of a look-out device that is entirely independent of the measurement system, or else that has parts in common with the same, e. g. the time bases or elements of the receiving circuits.

In the case of the separate equipment for the look-out, it is preferable for the same to operate with a longer wave, wide impulses and narrower band receiving circuits than for the measurement devices.

What is claimed is:

1. A position determining system for determining distance and direction by an electrical energy transmitted from a point and after reflection received substantially at said point, comprising a directive transmitting radiator for transmitting said electrical energy to the reflecting point, a directive receiving system adjacent said radiator, said receiving system being designed for adjustment in azimuth and elevation to determine the line of direction of said electrical energy received after reflection from a reflecting object, adjusting means for adjusting said directive receiving system to determine said line of direction, means for continuously turning said radiator and directive receiving system to render it effective over a given angular range, an indicator coupled to the output of said directive receiving system to indicate reflecting objects within said angular range, a plurality of indicating devices, means for adjusting said other indicating devices to cover a smaller angular range embraced within said given angular range, means for applying signals from the output of said directive receiving system to said other indicators, and means for individually adjusting said other indicators to produce on respective ones thereof indications of different position parameters.

2. A position determining system comprising a directive antenna system adjustable in azimuth and elevation to locate a direction line of an emitting source, a receiving system for receiving energy indicative of said azimuth and elevation adjustments relative to the emitting source, a first oscillograph indicator coupled to the output of said receiving system, means for producing a line on said first oscillograph indicator to indicate a scale, a second and third oscillograph indicator, means for producing on said second and third oscillograph indicator a scale of smaller range within the scope of the range on said first oscillograph, selectively operated means for adjusting the scale position of said second and third indicator with respect to said first indicator and means for applying said azimuth and elevation indicating signals to said second and third oscillograph respectively.

3. A position determining system according to claim 2, further comprising manually adjustable means associated, respectively with said second and third indicators and coupled to said directive antenna system, to adjust said antenna system in azimuth and elevation, respectively, to align it with the direction of said emitting source.

4. A position determining system according to claim 2, wherein said first indicator is a distance indicator comprising means for producing a local reference impulse, means for applying said reference impulse to said first indicator, and means for adjusting said reference impulse applied to said first indicator relative to the indication produced by the received energy indication to determine the position of said emitting source.

5. A position determining system according to claim 2, wherein said first indicator is a distance indicator comprising means for producing a local reference impulse, means for applying said reference impulse to said first indicator, means for adjusting said reference impulse applied to said first indicator relative to the indication produced by the received energy indication to determine the position of said emitting source, and means responsive to said reference impulse for controlling selective operation of said selectively operated means.

6. An analyzer comprising two cathode-ray tubes, x-axis and y-axis deflecting means for the rays of said tubes, means to render a series of signals visible on one of said cathode-ray tubes and means to render one of the same signals simultaneously visible on a larger scale on the other cathode-ray tube, and means to identify one of the small scale signals as the one that is on the other cathode-ray tube.

7. In a position analyzing system having means to transmit electrical energy for object detection, receiver means including first and second oscillographs to indicate the electrical energy reradiated at the locations of a plurality of objects, x-axis and y-axis deflecting means for said oscillographs, means to produce visible indications of the received reradiation energy on one of said oscillographs, and means to simultaneously produce visible indications of a given part of the same received reradiation energy at a larger scale on said second oscillograph.

8. In a position analyzing system having means to transmit electrical energy for object detection, receiver means including first and second oscillographs to indicate the electrical energy reradiated at the locations of a plurality of objects, x-axis and y-axis deflecting means for said oscillographs, means to produce visible indications of the received reradiated energy on one of said oscillographs, means to simultaneously produce visible indications of a given part of the same reradiated energy at a larger scale on said second oscillograph, and means for indicating the zone of the sweep of said first tube that corresponds to the time interval covered by said second tube.

9. In a position analyzing system having means to transmit signals for object detection, receiver means including first and second cathode ray tubes to indicate reradiation of said signals at the locations of a plurality of objects, x-axis and y-axis deflecting means for said tubes, means to render the received reradiated signals visible on one of said cathode ray tubes, means to render one of the reradiated signals simultaneously visible at a larger scale on the other cathode ray tube, and means for producing a reference pulse indication on the tracing of said first tube to indicate the signal indicated on the screen of said second tube.

10. In a position analyzing system adapted to transmit electrical energy for object detection, receiver means including first and second oscillographs to indicate reradiation of said electrical energy at the locations of a plurality of objects, x-axis and y-axis deflecting means for said oscillographs, means to produce visible indications of said reradiated energy on one of said oscillographs, means to simultaneously produce visible indications of a given part of the same reradiated energy at a larger scale on said second oscillograph, and means for producing a reference pulse indication on the screen of said first tube to indicate the part of the sweep of said first tube that corresponds to the time interval indicated by the sweep tracing of said second tube, and means to control the sweep potential of said second tube to make the tracing thereon correspond in duration to the time width of said reference pulse.

11. In a radio echo system, means for transmitting radio pulses and receiving echoes thereof, a plurality of viewing screens, means to indicate on one of said viewing screens all echoes received within a predetermined interval, said echoes being indicated in space sequence corresponding to the order of their reception, means to indicate a portion of said echoes on each of said other screens, and means to determine from one of said other screens the time of reception of a pulse indicated thereon and from a second of said other screens the direction from which said pulse was received.

12. In a radio echo system, means for transmitting radio pulses and receiving echoes thereof, a pair of viewing screens, means to indicate on one of said viewing screens all of said echoes in space sequence corresponding to the time sequence in which they are received, and means to indicate on the other of said screens only those echoes which are indicated in a small fraction of said space sequence.

13. In combination, means to transmit periodic pulses and to receive echoes thereof over a predetermined interval after each transmitted pulse, means to produce a second periodic pulse of the same frequency and short relative to said interval, a cathode ray oscillograph connected and arranged to indicate received echoes, means to operate said oscillograph to indicate said echoes only during said second pulses, and means to vary the phase relation between said first and second periodic pulses thereby to vary the time in said interval when said oscillograph is operated by said last means.

14. The combination, in a radio echo system in which impulses are transmitted and thereafter corresponding impulses are received from distant bodies at intervals dependent upon the distance thereto, of a plurality of cathode ray devices, each of said devices having a viewing screen, means to deflect the ray of one of said devices over a predetermined path on the respective viewing screen and to vary said ray during said deflection by each of the received impulses, means to produce in said ray during a small part of said deflection a further variation to produce a corresponding recognizable indication on said screen, means to deflect the ray of said other device across a predetermined path on its screen during said small part of said deflection of said first ray, and means to control said ray of said second device by pulses received during its deflection.

15. The combination, in a distance indication system, of means for transmitting impulses and receiving echoes thereof from distant objects, a pair of cathode ray devices, each having a viewing screen, means to deflect the ray of each of said devices over a predetermined path on the respective screen after each transmitted impulse, the ray of one device deing deflected over its path in a time determined by the maximum range of the system, and the ray of the other device being deflected over its path during a short portion of said time, means to control each ray during its deflection by the received echo, and means to indicate on said one device the time interval over which said deflection of the ray of the other device occurs.

16. A radio detection system comprising means to transmit impulses, a receiver means including first and second oscillographs to receive and indicate echo pulses caused by obstacles in response to transmitted impulses, means responsive to impulse transmission to generate a reference pulse of given duration, means to generate sweep potentials for said oscillographs, means to apply said reference pulse to said first oscillograph to produce thereon a reference indicator designating a time interval corresponding to said given duration, means for adjustably retarding the reference pulse to vary the time relation of the reference indicator with respect to the transmission of an impulse, and means responsive to energy of said reference pulse to synchronize the sweep of said second oscillograph with the part of the sweep of said first oscillograph designated by said reference indicator.

17. In a radio echo system having directivity, means for transmitting radio pulses and for receiving echoes thereof, means to alternate the axis of directivity of said system between two positions whereby an echo received from a distant object alternates in intensity by reason of said alternation of said axis of directivity, a pair of viewing screens, means to indicate on one of said screens all of said echoes in space sequence corresponding to the time sequence in which they are received and to indicate a particular portion of said echoes in two different positions on said other screen, said positions corresponding respectively to said different positions of said axis of directivity, and means to control said indications in each of said different positions in accord with the intensity of the echo received when said axis is in the corresponding position.

18. In a distance measuring system having directivity, means for transmitting radio pulses and for receiving echoes thereof, means to alternate the axis of directivity of said system between two positions whereby an echo received from a distant object alternates in intensity, a pair of viewing screens, means to indicate on one of said screens all of said echoes in space sequence corresponding to the time sequence in which they are received, means to indicate a particular portion of said echoes in two different positions on said other screen, said positions corresponding respectively to said different positions of said axis of directivity, means to control said indications in each of said different positions in accord with the intensity of the echo received when said axis is in the corresponding position whereby the direction of the remote object producing said echo may be determined from the comparison of the indications in said two positions, and means to vary the time of occurrence of said portion with respect to the time of occurence of the transmitted radio pulses.

19. The combination, in a radio echo apparatus, of means to transmit a radio pulse and to receive echoes thereof, a cathode ray device having a viewing screen, means to supply to said cathode ray device two pulses, one shorter than the other and both shorter than the interval over which echoes are received, means to deflect the beam of said device across a predetermined path on said screen during the longer of said pulses and to produce a predetermined variation therein recognizable on said screen during said shorter pulse, means responsive to a received echo to produce a variation in said beam recognizable on said screen, and means to produce coincidence of said two recognizable indications.

20. The combination, in a distance indicating system, of means for transmitting impulses and receiving echoes thereof from different distant reflecting surfaces, a pair of cathode ray devices, each having a viewing screen, means to deflect the ray of one of said cathode ray devices over a predetermined path on the screen thereof during a predetermined interval following each transmitted impulse, said interval corresponding to the range of said system, a control grid for the ray of the other of said devices, means to supply a pulse of short duration relative to said interval to both of said devices to deflect the beam of said one device from said path during said short pulse and to vary the potential of the control grid of the other device during said short pulse, means to deflect the beam of said other device across a predetermined path on the screen thereof during said short pulse, and means to control both of said beams by the received impulses during their traversal of their respective predetermined paths.

21. In obstacle detection apparatus adapted to transmit an impulse and receive an echo pulse caused in response thereto by an obstacle the location of which is desired, the combination therewith of first and second oscillographs, means to generate a reference pulse in synchronism with the transmission of said impulse, means adjustable to apply energy of the reference pulse to the first oscillograph to produce a reference indicator movable along the trace line thereof, means using the reference pulse to control the sweep circuit of the second oscillograph to cover with the second oscillograph a small part of the range of the first oscillograph at the location of the reference indicator, means to apply energy of the echo pulse to said second oscillograph, and means to retard one of the sources of energy applied to the oscillographs so that when said reference indicator is in coincidence with the echo pulse on the first oscillograph the echo pulse will appear at a predetermined position on the second oscillograph.

22. The combination in an echo apparatus, of means to radiate periodic pulses and to receive echoes thereof, said means comprising a directive antenna, means to shift the directive pattern of said antenna between two positions in train and two positions in elevation, a pair of cathode ray devices having viewing screens, means to indicate on one of said screens pulses received when said pattern is in said positions in train, and to indicate on the other of said screens pulses received when said pattern is in said positions in elevation, said indications on said screens being in positions thereon corresponding to the respective positions of said pattern, and means to vary said indications in accord with the intensity of the received pulses from which they are produced.

23. A method of determining the distance to an obstacle indicated on the screens of first and second oscillographs by an echo pulse produced by the obstacle in response to a transmitted impulse, comprising generating a reference pulse in timed relation with the transmission of said impulse, applying energy of said reference pulse to the first oscillograph to produce a reference indicator for adjustment along the trace line thereof, applying energy of the reference pulse to control the trace line of the second oscillograph to cover a small part of the range of the first oscillograph at the location of the reference indicator, applying energy of the echo pulse to the second oscillograph, and retarding by a predetermined amount one of the sources of energy applied to the oscillographs, so that when the indicator is in coincidence with the echo pulse, the echo pulse will appear at a predetermined position on the second oscillograph.

24. An analyzer comprising two cathode-ray tubes, x-axis and y-axis deflecting means for the rays of said tubes, and means to render a series of signals visible on one of said cathode-ray tubes and means to render one of the same signals simultaneously visible on a larger scale on the other cathode-ray tube, in which means is provided to render at will any one of the series of signals visible on the other cathode-ray tube.

25. The combination, in a radio echo apparatus, of means to transmit a radio pulse and to receive echoes thereof, a cathode ray device having a viewing screen, means to supply to said cathode ray device two pulses, one shorter than the other and both shorter than the interval over which echoes are received, said shorter pulse occurring during said longer pulse, means to deflect the beam of said device across a predetermined path on said screen during the longer pulse and to produce a variation therein recognizable on said screen during said shorter pulse, means responsive to a received echo to produce a further variation of said beam recognizable on said screen, and means to vary the time of occurrence of said two pulses relatively to vary said two recognizable variations relatively in position on said screen.

26. In combination, means to transmit periodic pulses and to receive echoes thereof, a cathode ray device having a viewing screen and ray deflecting means, means producing control pulses at the same repetition rate as said transmitted pulses, means including a sweep-wave generator controlled by said control pulses and energizing said beam deflecting means in response to each control pulse to deflect the ray of said device across said screen during an interval which is relatively short with respect to the period between transmitted pulses, means to produce a predetermined variation of said ray at a time during said interval thereby to produce a recognizable indication at an intermediate position on said screen, means to control said ray by said received echoes to produce an indication on said screen of echoes received during said interval, and adjustable phase-shifting means controlling the operation of said sweep-wave generator to vary the time of operation thereof and thereby to vary the time of occurrence of said interval with respect to a transmitted pulse whereby indications of received echoes on said screen move relative to said recognizable indication.

27. In combination, means to transmit a first series of periodic pulses and to receive echoes thereof over a predetermined interval of time after each transmitted pulse, means to produce a second series of periodic pulses of the same repetition rate as said first series, a cathode ray oscillograph having an indicator screen and ray deflecting means, means controlled by each pulse in said second series of pulses for energizing said ray deflecting means to effect deflection of the ray of said oscillograph over a trace path extending substantially entirely across said screen, following each pulse in said first series, and within a sweep interval which is relatively short with respect to said predetermined interval, means to vary the phase relation between said first and said second series of periodic pulses thereby to vary the time in said predetermined interval when the ray of said oscillograph is deflected over said trace path by said last means, and means controlled by said received echoes and acting on said ray to produce a visible indication along said trace path in response to an echo received during said sweep interval.

References Cited in the file of this patent

UNITED STATES PATENTS

| | | |
|---|---|---|
| 2,189,549 | Hershberger | Feb. 6, 1940 |
| 2,223,224 | Newhouse | Nov. 26, 1940 |

FOREIGN PATENTS

| | | |
|---|---|---|
| 837,239 | France | Nov. 3, 1938 |